United States Patent [19]

Farnung et al.

[11] Patent Number: 4,989,963
[45] Date of Patent: Feb. 5, 1991

[54] BINOCULAR TELESCOPE WITH COUPLED JOINT FOCUSING AND UNCOUPLED SEPARATE FOCUSING

[75] Inventors: H. Peter Farnung, Bad Nauheim; Alfred Hengst, Lahnau; Heinz Keiner, Solms, all of Fed. Rep. of Germany

[73] Assignee: Leica GmbH, Solms, Fed. Rep. of Germany

[21] Appl. No.: 404,511

[22] Filed: Sep. 8, 1989

[30] Foreign Application Priority Data

Sep. 9, 1988 [DE] Fed. Rep. of Germany ....... 3830620

[51] Int. Cl.⁵ .................. G02B 23/00; G02B 7/06
[52] U.S. Cl. ................................. 350/556; 350/552
[58] Field of Search ......................... 350/545–557

[56] References Cited

U.S. PATENT DOCUMENTS

| | | | |
|---|---|---|---|
| 802,817 | 10/1905 | Lloyd | 350/552 |
| 2,811,895 | 11/1957 | Jensen | 88/34 |
| 3,484,149 | 12/1969 | Becker et al. | 350/552 |
| 3,712,704 | 11/1973 | Sato | 350/554 |
| 4,630,901 | 12/1986 | Altenheiner et al. | 350/552 |

FOREIGN PATENT DOCUMENTS

| | | |
|---|---|---|
| 2950204 | 7/1980 | Fed. Rep. of Germany . |
| 973186 | 2/1951 | France ............... 350/556 |

Primary Examiner—Jon W. Henry
Attorney, Agent, or Firm—Foley & Lardner, Schwartz, Jeffery, Schwaab, Mack, Blumenthal & Evans

[57] ABSTRACT

The binocular telescope with internal focusing and articulated bridge contains as a joint focusing mechanism two setting rings which can be coupled and which are arranged co-axially on a central axis. In uncoupled condition each setting ring is allocated to a focusing member of a tube, so that focusing can be done independently from each other. In coupled condition both focusing members are shifted jointly by actuation of each of the setting rings. Thus, an unintentional adjustment of the relative positions of the two focusing members is impossible, and focusing of each focusing member in succession is possible.

13 Claims, 1 Drawing Sheet

Wild Leitz GmbH · Wetzlar
Konzernstelle Patente + Marken

BINOCULAR TELESCOPE WITH COUPLED JOINT FOCUSING AND UNCOUPLED SEPARATE FOCUSING

BACKGROUND OF THE INVENTION

The present invention relates to a binocular telescope with an articulated bridge connecting both tubes and with joint focusing for combined adjustment of focusing members which are inside the tubes.

A binocular telescope with internal focusing is known from DE-GM No. 1,694,491. With this telescope (beside the combined adjustment of both focusing members) a single focusing in one of the tubes is possible for the compensation of the visual facility of the eyes of the user, a so-called diopter focusing. The joint focusing for combined adjustment of both focusing members can be uncoupled from one focusing member so that only this one focusing member can be adjusted. In particular, in this known telescope a turning knob is located within the articulated connection of both tubes which operates via an axis on this focusing member. This axis is encompassed by a hollow axle and a hollow turning knob which is under spring tension and acts on the other (second) focusing member.

Both turning knobs are connected by a friction clutch, which can be released by pressing the exterior turning knob against the spring tension. With this telescope an independent adjustment of each of the focusing members in succession is impossible.

From DE-OS No. 29 50 204 a binocular telescope is known, which has, besides an arrangement for adjustment of a variable magnification, a joint focusing mechanism which is operated by two co-axial adjusting knobs for focusing and diopter focusing. Both adjusting knobs are connected by a locking pin and are turned simultaneously for focusing. The adjusting knob for focusing must be held fast for diopter focusing and the adjusting knob for focusing must be turned for focusing. Moreover, the adjusting knobs operate on frames of the objective lenses in both tubes by shifting the lenses along the optical axis and therefore, this known telescope does not show internal focusing.

SUMMARY OF THE INVENTION

Therefore, it is the object of the invention to provide a binocular telescope of the abovementioned type, in which both focusing members may be coupled or uncoupled. In the coupled condition, movement of each focusing member is dependent on the movement of the other focusing member. In the uncoupled condition each focusing member may be moved independently of the other focusing member, in order to compensate for the visual capability of each eye independently, while maintaining a constant distance between the oculars and lenses in each tube. Thus, the user can move the focusing members separately or together, and the independent and dependent movements can be made in any conceivable succession the user desires. In addition, friction in the system is minimized, and the system is almost free of play, so that erroneous adjustments of only one focusing member are nearly impossible.

Another object of the invention is to provide a binocular telescope which allows for independent and dependent focusing by using a joint focusing system which has two setting rings which can be coupled co-axially on a central axis, whereby each setting ring is adjoined to one of the focusing members for independent internal focusing from each other when the setting rings are in an uncoupled condition.

By using two setting rings which can be coupled or uncoupled, the user can focus each of the tubes, according to the visual facility of his eyes, in any order which he chooses. It is immaterial with which tube the user chooses to begin focusing. After focusing each tube independently, if sufficient pressure is applied on the setting ring closest to the eyes, both setting rings become connected, which allows the user to perform combined focus setting.

Another object of the invention is to provide a binocular telescope which can be used and adjusted with only one hand.

In accomplishing the foregoing objects, there has been provided according to one aspect of the invention a binocular telescope comprising:
 a. a first tube;
 b. a second tube;
 c. an articulated bridge connected to said first tube and to said second tube;
 d. a first focusing member located in said first tube;
 e. a second focusing member located in said second tube;
 f. a first setting ring coupled to said first focusing member;
 g. a second setting ring coupled to said second focusing member;
 h. means for selectively coupling and uncoupling said first and second focusing members to provide a joint focusing mechanism.

According to a preferred embodiment of the invention, segmental arches can be inserted in a ring groove of a clutch drive ring, which is arranged to prevent torsion with the first setting ring. These segmental arches engage on one side with a mounted plug in radial borings of this clutch drive ring, and on the other side they can be coupled to a second setting ring by a toothing which extends axially on an outer surface of the segmental arch. This arrangement achieves a positive clutch between both setting rings.

Further objects, features and advantages of the invention are set forth in the following detailed description of preferred embodiments, when considered with the attached figures and drawing. All parts which are not necessary for comprehension are omitted or remain unmarked for clarity in the drawings.

DETAILED DESCRIPTION OF THE PREFERRED EMBODIMENTS

Figure 1:
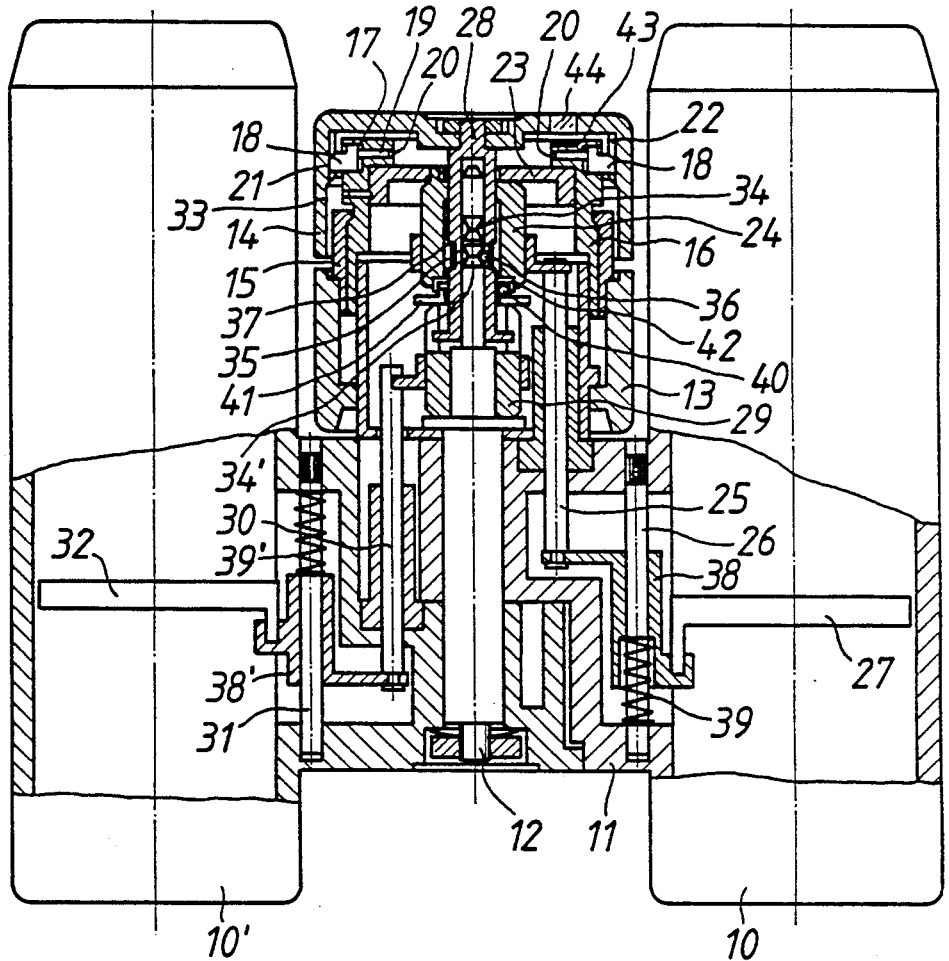
FIG. 1 shows a partial section of the front view of the binocular telescope according to the invention with both setting rings in a coupled condition.

In the section of the telescope as shown in FIG. 1 an articulated bridge 11 connects a left tube 10 with a right tube 10', which has the same structure as left tube 10 and is arranged symmetrically to tube 10. In the articulated bridge 11, between the tubes 10 and 10', a central axis 12 is mounted on which a first setting ring 13 and an overlying second setting ring 14 are co-axially arranged. Together these setting rings form the joint focusing mechanism of the binocular telescope.

Figure 2:
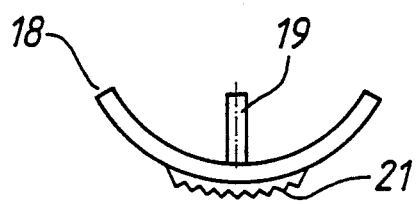
FIG. 2 shows a view of a segmental arch.

FIG. 1 shows both setting rings 13 and 14 in coupled condition. A counter ring 15 connects the first setting ring 13 with a clutch drive ring 16 in order to prevent torsion. The clutch drive ring 16 has a ring groove 17, in which a single segmental arch 18 are engageable (FIG. 2). A plug 19 mounted on each segmental arch 18 engages a radial boring 20 of the clutch drive ring 16, and a toothing 21, which is axially directed and is arranged on the outer surface of the segmental arch 18, establishes a positive clutch with a corresponding internal toothing 22 of the overlying second setting ring 14.

For movement of focusing member 27 in the left tube 10, counter ring 15, clutch drive ring 16, a driving disc 23 and a worm gear 24 transfer each motion of revolution of the first setting ring 13 to a transfer element 25, a mounting 38 and a connected focusing member 27. A first motion rod 26 is supported in mounting 38. Focusing member 27 is guided by mounting 38, free from play due to the compensating spring 39, in the left tube 10. Rotation of the first setting ring 13 moves focusing member 27 even when the first setting ring 13 is not coupled to the second setting ring 14.

For movement of focusing member 32 in the right tube 10', when first setting ring 13 is coupled to second setting ring 14, each motion of revolution of this first setting ring 13 is also transferred by the positive clutch to the second setting ring 14, a rest bush 28 arranged on central axis 12, and in addition, to a worm gear 29. This worm gear 29 engages in a transfer element 30 which is connected with a mounting 38'. A second motion rod 31 is supported in the mounting 38'. Focusing member 32 is also guided by mounting 38', free from play due to the compensating spring 39', in the right tube 10'.

When the first setting ring 13 is coupled to the second setting ring 14, a motion of revolution of the second setting ring 14 is not only transmitted to the focusing member 32 of the right tube 10', but is also transmitted equally to the focusing member 27 of the left tube 10, because the toothings 21 and 22 positively couple the setting rings 13 and 14. Both focusing members 27 and 32 shift simultaneously in the tubes 10 and 10' when the setting rings are in the coupled condition; therefore, it is immaterial which setting ring 13 or 14 is turned since rotation of either setting ring has the same effect.

In order to decouple the first setting ring 13 from the second setting ring 14, the positive clutch between first and second setting rings 13 and 14 is disengaged by pulling the second setting ring 14. As a result of pulling the second setting ring 14, the axially extended toothing 21 at the outer surface of the segmental arch 18 glides out of the internal toothing 22 of the second setting ring 14. Each segmental arch 18 is mounted under initial tension in the ring group 17 of clutch drive 16. Therefore, by pulling setting ring 14, each segmental arch 18 is pressed into a widened area 33 below the internal toothing 22 of the setting ring 14. The central axis 12 has two grooves 34 and 34' in which balls 36 are pressed by a spring 35 in order to secure the uncoupled condition of both setting rings 13 and 14. These balls 36 are arranged in a relief 37 of the rest bush 28. By this means the second setting ring 14 can be moved into one of two lock-in positions, although the first setting ring 13 is fixed axially.

In uncoupled condition, rotation of the first setting ring 13 is obviously transmitted only on worm gear 24 and by that only on focusing member 27 of the left tube 10 of the binocular telescope. By turning the second setting ring 14, only focusing member 32 in the right tube 10' is moved. At first each tube 10 or 10' is focussed separately for each eye; therefore, an individual diopter focusing mount is not required. By pressing the second setting ring 14, coupling of this setting ring with the first setting ring 13 is established. In this coupled position, focusing members 27 and 32 can be shifted simultaneously, while maintaining their relative positions with each other, even if only one of the setting rings 13 or 14 is rotated.

Motion rods 26 and 31 which correspond to the focusing members 27 and 32, respectively, are fixed in the casing and guided in mountings 38 and 38', respectively. The mountings 38 and 38' are connected on one side with the transfer elements 25 and 30 and engage on the other side with the focusing members 27 and 32, respectively.

The motion rods 26 and 31 are surrounded by compensation springs 39 and 39' which act upon the mountings 38 and 38' such that the play in the transfer elements is largely eliminated, i.e., from the setting rings 13 and 14 to the focusing members 27 and 32. The compensation springs 38 and 38' work in opposite directions in order to level the adjusting forces of counter-clockwise rotation of the coupled setting rings 13 and 14 as well as the adjusting forces of clockwise rotation.

A bearing plate 41, which supports the ball bearings 40 is arranged at the rest bush 28, between the worm gears 24 and 29. Above these ball bearings 40 is a bearing ring 42, which is inserted in the bottom of worm gear 24. By this means a bearing is formed which has very little friction and is essentially free of its effects and which in uncoupled condition only permits movement of the worm gear which corresponds to the respective setting ring which is rotated, i.e., the other worm gear does not move.

As already described, the binocular telescope can be focussed by separate adjustment of both focusing members 27 and 32 inside the tubes 10 and 10' by movement of the uncoupled setting rings 13 and 14. In the surface of clutch drive 16 of the first setting ring 13, a diopter-disc 43 with index is inserted facing a window 44 mounted in the second setting ring 14. In the coupled condition, by turning one of the setting rings 13 or 14, the diopter-disc 43 and window 44 move simultaneously in the same direction around central axis 12. In the uncoupled condition, if setting rings 13 and 14 are rotated relative to one another, obviously diopter-disc 43 and window 44 will also be moved relative to one another.

It is understood that variations of the described embodiments are possible. For example, it is conceivable to provide a clutch actuated by adherence in the form of an elastic ring instead of the positive clutch. Also, the bearing between both worm gears can be formed divergently.

What is claimed is:
1. A binocular telescope comprising:
  a. a first tube;
  b. a second tube;
  c. an articulated bridge connected to said first tube and to said second tube;
  d. a first focusing member located in said first tube;
  e. a second focusing member located in said second tube;
  f. a first setting ring coupled to said first focusing member;
  g. a second setting ring coupled to said second focusing member;

h. means for selectively coupling and uncoupling said first and second focusing members to provide a joint internally focusing mechanism.

2. A binocular telescope as claimed in claim 1, wherein said means comprises means for selectively coupling and uncoupling said first and second setting rings.

3. A binocular telescope as claimed in claim 2, further comprising at least two worm gears, at least two transfer elements and at least two mountings which are each connected to either said first or said second tube, wherein each of said first or said second setting rings is coupled to at least one of said at least two worm gears, to at least one of said at least two transfer elements and to one of said at least two mountings.

4. A binocular telescope as claimed in claim 3, further comprising motion rods which are connected to said mountings, wherein each of said mountings is coupled to at least one of said at least two transfer elements and is coupled to either said first or second focusing member.

5. A binocular telescope as claimed in claim 4, further comprising a compensation spring surrounding each of said motion rods.

6. A binocular telescope as claimed in claim 3, further comprising bearing arranged between said worm gears which includes a bearing disc, a bearing ring and balls.

7. A binocular telescope comprising:
a. two tubes;
b. means for connecting said two tubes;
c. a first focusing member located in one of said two tubes;
d. a second focusing member located in one of said two tubes;
e. means for simultaneously adjusting said first focusing member and said second focusing member;
f. means for internally focusing said first focusing member independently of said second focusing member; and
g. means for internally focusing said second focusing member independently of said first focusing member.

8. A binocular telescope comprising:
a. two tubes;
b. an articulated bridge for connecting said two tubes;
c. a first focusing member located in one of said two tubes;
d. a second focusing member located in one of said two tubes;
e. a first focusing mechanism for internally focusing said first focusing member independently of said second focusing member;
f. a second focusing mechanism for internally focusing said second focusing member independently of said first focusing member; and
g. a coupling mechanism for selectively coupling the movement of said first focusing member to the movement of said second focusing member.

9. A binocular telescope as claimed in claim 8, wherein said first and said second focusing mechanisms comprise a first and second setting ring, respectively.

10. A binocular telescope comprising:
a. a first tube;
b. a second tube;
c. an articulated bridge connected to said first tube and to said second tube;
d. a first focusing member located in said first tube;
e. a second focusing member located in said second tube;
f. a first setting ring coupled to said first focusing member;
g. a second setting ring coupled to said second focusing member;
h. means for selectively coupling and uncoupling said first and second focusing members to provide a joint focusing mechanism, said means comprising means for selectively coupling and uncoupling said first and second setting rings, said means for coupling and uncoupling said setting rings comprising a clutch drive ring with a ring groove, at least one segmental arch with mounted plug and toothing connected to said segmental arch, wherein said segmental arch with mounted plug engages in the ring grooves of said clutch drive ring and is coupled to one of said setting rings by said toothing.

11. A binocular telescope as claimed in claim 10, further comprising a diopter disc positioned above said clutch drive ring and a window positioned on said second setting ring, wherein said diopter disc can be read through said window.

12. A binocular telescope comprising:
a. a first tube;
b. a second tube;
c. an articulated bridge connected to said first tube and to said second tube;
d. a first focusing member located in said first tube;
e. a second focusing member located in said second tube;
f. a first setting ring coupled to said first focusing member;
g. a second setting ring coupled to said second focusing member;
h. means for selectively coupling and uncoupling said first and second focusing members to provide a joint focusing mechanism, said means comprising means for selectively coupling and uncoupling said first and second setting rings, one of said setting rings being fixed axially and, another one of said setting rings being movable axially between two fixed positions.

13. A binocular telescope comprising:
a. two tubes;
b. an articulated bridge for connecting said two tubes;
c. a first focusing member located in one of said two tubes;
d. a second focusing member located in one of said two tubes;
e. a first focusing mechanism for focusing said first focusing member independently of said second focusing member;
f. a second focusing mechanism for focusing said second focusing member independently of said first focusing member; and
g. a coupling mechanism for selectively coupling the movement of said first focusing member to the movement of said second focusing member, said first and second focusing mechanisms comprising a first and second setting ring, respectively, and said coupling mechanism comprising a clutch drive ring with a ring groove, at least one segmental arch with mounted plug and a toothing connected to said segmental arch, wherein said segmental arch with mounted plug engages in the ring groove of said clutch drive and is coupled to either said first or said second setting ring by said toothing.

* * * * *